US012734808B2

(12) United States Patent
Kanno

(10) Patent No.: US 12,734,808 B2
(45) Date of Patent: Sep. 15, 2026

(54) SPOOL, LONG MEMBER, CONVEYING DEVICE, AND CLEANING DEVICE

(71) Applicant: KONICA MINOLTA, INC., Tokyo (JP)

(72) Inventor: Ryoichiro Kanno, Sagamihara (JP)

(73) Assignee: KONICA MINOLTA, INC., Tokyo (JP)

(*) Notice: Subject to any disclaimer, the term of this patent is extended or adjusted under 35 U.S.C. 154(b) by 479 days.

(21) Appl. No.: 18/207,837

(22) Filed: Jun. 9, 2023

(65) Prior Publication Data

US 2024/0010001 A1 Jan. 11, 2024

(30) Foreign Application Priority Data

Jul. 11, 2022 (JP) ................................. 2022-111472

(51) Int. Cl.
*B41J 2/165* (2006.01)
*B41J 11/00* (2006.01)

(52) U.S. Cl.
CPC ....... *B41J 2/16535* (2013.01); *B41J 11/0095* (2013.01)

(58) Field of Classification Search
CPC ........................... B41J 2/16535; B41J 11/0095
See application file for complete search history.

(56) References Cited

U.S. PATENT DOCUMENTS 3,458,706 A * 7/1969 Ravenhall .............. G11B 15/08
5,087,137 A * 2/1992 Burnard ................... B41J 35/36 400/249
5,393,149 A * 2/1995 Iima ......................... B41J 17/36 400/208
6,021,283 A * 2/2000 Yoshida ............... G03B 17/425 396/408
7,390,134 B2 * 6/2008 Bateman .............. B65H 75/182 400/242
8,820,890 B2 9/2014 Ishibashi et al.
9,862,212 B2 1/2018 Fujioka
2009/0283167 A1 * 11/2009 Nakagawa ............. B65H 51/30 100/2

FOREIGN PATENT DOCUMENTS

JP H09152655 A * 6/1997
JP 3331725 * 10/2002
JP 5527016 B2 4/2014
JP 5857969 B2 12/2015
JP 6358281 B2 6/2018

OTHER PUBLICATIONS

Japanese Office Action (and an English language translation thereof) dated Jun. 2, 2026, issued in counterpart Japanese Application No. 2022-111472.

* cited by examiner

*Primary Examiner* — Christle I Marshall

(74) *Attorney, Agent, or Firm* — Holtz, Holtz & Volek PC

(57) ABSTRACT

A spool that is rotatably journaled and has a long member wound around the spool, includes: a marker with which a side face of the spool is provided, the side face being orthogonal to a rotation axis of the spool, wherein the marker includes an information-detection bit marker indicating information regarding the long member.

12 Claims, 9 Drawing Sheets

SPOOL, LONG MEMBER, CONVEYING DEVICE, AND CLEANING DEVICE

The entire disclosure of Japanese patent Application No. 2022-111472, filed on Jul. 11, 2022, is incorporated herein by reference in its entirely.

BACKGROUND

Technological Field

The present invention relates to a spool, a long member, a conveying device, and a cleaning device.

Description of the Related Art

An inkjet-type image forming apparatus includes a cleaning device that removes, after printing, ink remaining on the nozzle face where the nozzles of the inkjet head are opened. The cleaning device includes a rubber blade (wiper) or a wiping member with water absorbency such as a nonwoven fabric. The cleaning device makes the rubber member slide on the nozzle face of the inkjet head or brings the wiping member into contact with the nozzle face of the inkjet head to remove the ink (e.g., JP No. 585797969). As an example of the cleaning device provided with a wiping member, a cleaning device includes a wiping member 7 and a backup member 8 as illustrated in FIG. 1. The wiping member 7 is pushed with the backup member upward onto the nozzle face as the lower face of a nozzle 91 included in an inkjet head 9, whereby ink is wiped off. The wiping member 7 is a long member wound around a spool 11. A portion of the wiping member 7 brought into contact with the nozzle face is wound around a winding spool 12 that drives rotationally, and is collected as a used portion.

Examples of baud-shaped or linear flexible long members include wiping members and wires. Many of such long members are wound in a roll shape around spools as cores and then are distributed. Such a long member is journaled to the spool and supplied to the conveyance system of a device that processes and uses the long member. In such a device, for example, in order to accurately predict the timing to insert a new one turn (cartridge), disclosed is a technique of detecting the remaining amount of a long member in a cartridge inserted in the device (e.g., JP No. 5527016 and JP No. 6358281).

JP No. 5527016 discloses a technique of detecting the remaining amount of a tape of a cartridge of a label printer that performs printing on the tape. JP No. 6358281 discloses a technique of detecting the remaining amount of an ink ribbon of a thermal-transfer image forming apparatus using the ink ribbon. The label printer and the image forming apparatus each include a member and an optical sensor. The member is provided with a large number of markers at a constant pitch along the circumference about the rotation axis and rotates in conjunction with the spool of the cartridge. The optical sensor detects the markers. The rotation rate (angular velocity) of the spool is measured with the member and the optical sensor. In JP No. 5527016, the remaining amount of the tape is calculated on the basis of a relational expression between the rotation rate of the spool and the remaining amount (length) of the tape of the cartridge. In JP No. 6358281, the remaining amount of the ink ribbon is calculated on the basis of the rotation rate of the spool of the cartridge and a pulse signal for driving a stepping motor for winding the ink ribbon.

For a member supplied to a device by a cartridge, information such as the model number or serial number of the member is typically recorded when a new cartridge is inserted into the device (at the time of replacement). Therefore, the operator inputs the information into an information terminal such as a personal computer (PC), or uses a dedicated reader for reading a barcode or a two-dimensional code attached to, for example, the exterior of the cartridge.

SUMMARY

The present invention has been made in view of the above issues, and an object of the present invention is to provide a spool, a long member wound around such a spool, a conveying device, and a cleaning device including such a conveying device that enable reading, without a dedicated reader, of information regarding a cartridge of a roll-shaped long member.

To achieve the abovementioned object, according to an aspect of the present invention, there is provided a spool that is rotatably journaled and has a long member wound around the spool, and the spool reflecting one aspect of the present invention comprises: a marker with which a side face of the spool is provided, the side face being orthogonal to a rotation axis of the spool, wherein the marker includes an information-detection bit marker indicating information regarding the long member.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
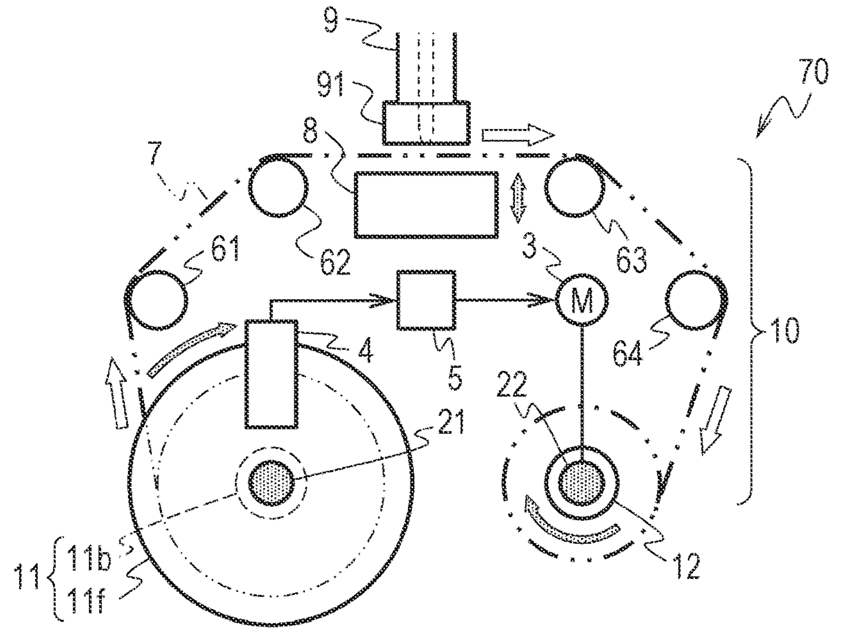
FIG. 1 is a schematic configuration view of a cleaning device with a conveying device installed thereon according to an embodiment of the present invention.

Hereinafter, a spool, a long member, a conveying device, and a cleaning device according to one or more embodiments of the present invention will be described with reference to the drawings. However, the scope of the invention is not limited to the disclosed embodiments. Note that the size, positional relationship, and others of the members illustrated in the drawings may be exaggerated in order to clarify the description, and the shape may be simplified. In the following description, the same or similar members are denoted with the same reference signs, and the description thereof is not given appropriately.

First Embodiment (Conveying Device)

FIG. 1 is a schematic configuration view of a cleaning device with a conveying device installed thereon according to an embodiment of the present invention, and illustrates the configuration viewed from the side. A cleaning device 70 illustrated in FIG. 1 is installed on an inkjet-type image forming apparatus including an inkjet head 9 having a nozzle 91. The cleaning device 70 cleans the nozzle face as the lower face of the nozzle 91 of the inkjet head 9 of the image forming apparatus. The cleaning device 70 includes a wiping member (long member) 7, a conveying device 10 that conveys the wiping member 7, and a backup member 8. The conveying device 10 includes a feeding roller (support member) 21, a winding roller 22, a motor 3, a sensor 4, a controller (calculator) 5, and guide rollers 61, 62, 63, and 64. The feeding roller 21 supports and rotates together with a spool 11 around which the wiping member 7 is wound. The winding roller 22 drives rotationally while supporting the winding spool 12 that winds the wiping member 7. The motor 3 causes the winding roller 22 to drive rotationally. The sensor 4 detects a marker with which one side face (flange **11*f*) of the spool 11 is provided. Hereinafter, each element of the conveying device 10 according to the embodiment of the present invention will be described. The cleaning device 70** will be described later.

The rollers 21 and 22 are support members rotatably journaled on the basis of a rotation axis in a direction orthogonal to the drawing plane in FIG. 1. The roller 21 and the roller 22 externally fit and engage the spool 11 and the spool 12, respectively. The feeding roller 21 is a driven shaft that rotates together with the spool 11 when the long member 7 wound around the spool 11 is delivered from the outer side of the wound. The winding roller 22 is an active shaft that rotates due to transmission of a rotational motion is from the motor 3, and rotates the winding spool 12 together to wind the long member 7 around the winding spool 12 for conveyance. In FIG. 1, both the rollers 21 and 22 convey together the long member 7 in a direction indicated by outlined arrows while rotating clockwise as indicated by dot-patterned arrows. The feeding roller 21 preferably has a structure such as a torque limiter with which an appropriate load is applied to the rotation so as not to slacken the long member 7 between the spools 11 and 12 due to unnecessarily rotation for a feeding portion of feeding of the long member 7. Alternatively, the feeding roller 21 may be an active shaft rotated by the motor 3 or a motor different from the motor 3.

The motor 3 is a power source of the conveying device 10, and rotationally drives the winding roller 22 through a transmission (not illustrated) such as a gear as necessary. As the motor 3, a motor in response to the application of the conveying device 10 is applicable. In the present embodiment, a stepping motor is suitable as a device for conveying the wiping member 7 of the cleaning device 70.

The sensor 4 determines the presence or absence of a marker at a predetermined distance from the rotation axis, on the one side face (flange **11*f*) of the spool 11 externally fitted to the feeding roller 21. As the sensor 4, a known contactless or contact device for a short distance (detection distance about several millimeters or less) is applicable. A contactless reflective photosensor including a light projector (light emitting element) and a photoreceptor (light receiving element) is preferable. Alternatively, a different known device such as a contactless (optical) or contact distance sensor (range sensor) is applicable to the sensor 4. In the conveying device 10 according to the present embodiment, the sensor 4 can parallelly detect two locations (sensing positions 41 and 42 illustrated in FIG. 3) different in distance from the rotation axis of the spool 11. Such sensors of the sensor 4** that detect at the respective locations are referred to as a first sensor and a second sensor.

The controller 5 is a computer (calculator) including a central processing unit (CPU) and a memory, and can be built in a computer that controls an image forming apparatus equipped with the conveying device 10 according to the present embodiment. The controller 5 outputs a pulse signal for driving the motor 3 to control the motor 3 for setting the rotation and stop of the winding roller 22, or further setting the rotation rate and the rotational direction as necessary. In response to detection of the presence or absence of a marker by each of the first sensor and the second sensor of the sensor 4, the controller 5 receives the information regarding the detection. Then, the controller 5 calculates the remaining amount of the long member 7 (the length of the portion wound around the spool 11) and reads the information given to the spool 11. Details of these operations of the controller 5 will be described later.

The guide rollers 61, 62, 63, and 64 are driven shafts rotatably journaled on the basis of the rotation axis in the direction orthogonal to the drawing plane in FIG. 1. The guide rollers 61, 62, 63, and 64 stretch the long member 7 between the rollers 21 and 22 (between the spools 11 and 12), and rotate as the long member 7 is conveyed. The number of guide rollers 61, 62, 63, and 64 are installed at positions corresponding to the disposition of the rollers 21 and 22 and a conveyance path for the long member 7. In the conveying device 10 according to the present embodiment, as a device that conveys the wiping member 7 of the cleaning device 70 of the image forming apparatus, at least a guide roller 62 and a guide roller 63 disposed, respectively, in the vicinity of the nozzle 91 of the inkjet head 9 on the front (downstream) side and the rear (upstream) side in the conveyance direction are preferably included.

(Spool)

Figure 2:
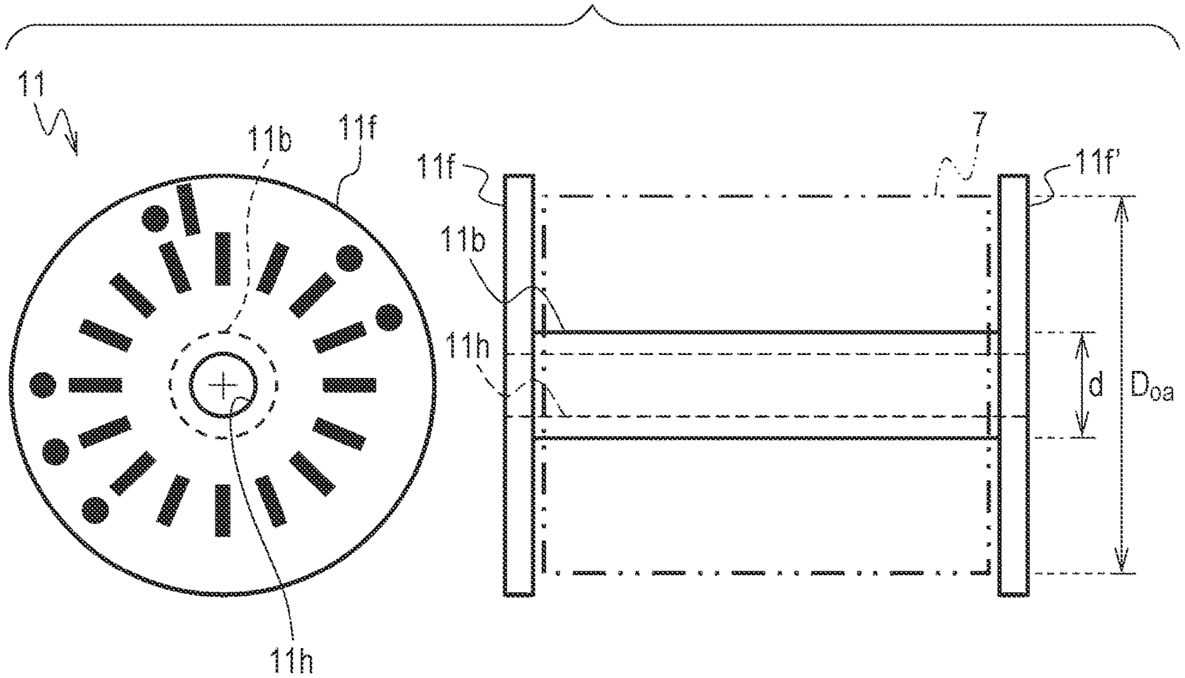
FIG. 2 schematically illustrates two views of a spool according to a first embodiment of the present invention.

FIG. 2 schematically illustrates two views of the spool according to the first embodiment of the present invention. The spool 11 is a package member for winding and holding the long member 7, and is a jig that supplies the long member 7 in the conveying device 10. The spool 11 includes a body (barrel) 11*b* having a cylindrical outer shape, a disk-shaped flange 11*f* externally extending from the one side face of the body 11*b* (one bottom face of the cylinder), and the other disk-shaped flange 11*f'* externally extending from the other side face of the body 11*b* (the other bottom face of the cylinder). The cylindrical body 11*b* has a through hole 11*h* through which the feeding roller 21 of the conveying device 10 is inserted and fit, but it not limited to such a shape and may have a shape allowing the body 11*b* to engage the feeding roller 21 and rotate together. The flange 11*f* and 11*f*, respectively, hold the long member 7 wound around the body 11*b* on the one side and the other side of the body 11*b* such that the longer member wound around the body 11*b* is not detached from the body 11*b*. Therefore, the gap between the flange 11*f* and the flange 11*f'* is equal to or larger than the width of the long member 7, and is preferably slightly longer than the width thereof. Further, the diameters of the flange 11*f* and 11*f'* are preferably larger than the outer diameter (maximum outer diameter) $D_{on}$ of the long member 7 with the entire length (length $L_{on}$) thereof wound around the body 11*b*. The spool 11 may be formed of a material having a plate thickness and strength necessary for supporting the long member 7, and the body 11*b* and the flanges 11*f* and 11*f'* may be formed of different materials. In the present embodiment, the flange 11*f* has a space for markers $m_{bit}$, $m_{pt}$, $m_{ST}$ (see FIG. 3) provided along the circumference about the rotation axis (the central axis of the body 11*b*) on the one side face of the spool 11. The end (rear end) of the innermost circumference of the wound long member 7 is fixed to the spool 11 with, for example, an adhesive tape such that the spool 11 rotates in feeding of the long member 7.

Figure 3:
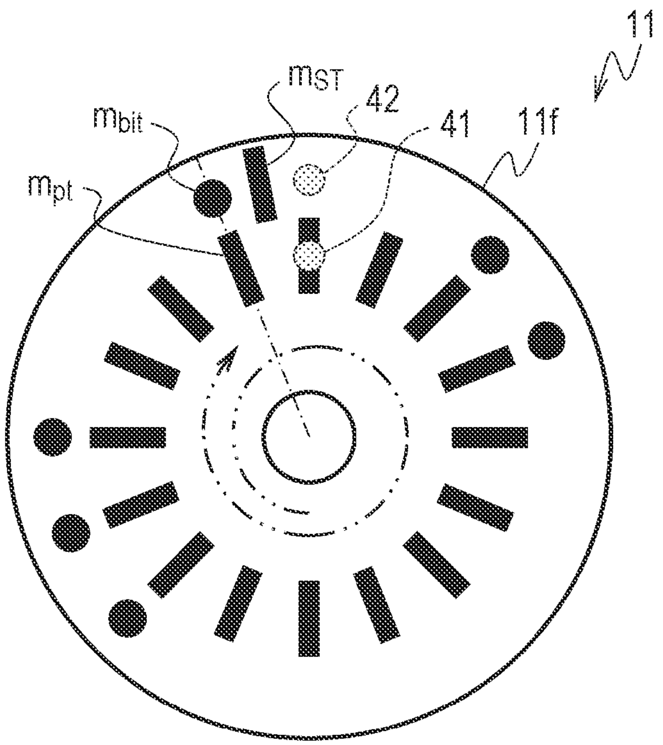
FIG. 3 is an explanatorily schematic view of marker disposition on the spool illustrated in the side view of FIG. 2.

FIG. 3 is an explanatorily schematic view of disposition of the markers on the spool illustrated in the side view of FIG. 2, and is a plan view of the flange 11*f*. The presence or absence of the markers $m_{bit}$, $m_{pt}$, and $m_{ST}$ can be detected by the sensor 4 (first sensor and second sensor) of the conveying device 10. Ina case where the sensor 4 is a reflective photosensor, the markers $m_{bit}$, $m_{pt}$, and $m_{ST}$ are formed so as to be different in reflectance of light from the surface (outside of the markers $m_{bit}$, $m_{pt}$, $m_{ST}$) of the flange 11*f*. For example, in a case where the surface of the flange 11*f* is formed of glossy metal or resin, the markers $m_{bit}$, $m_{pt}$, and $m_{ST}$ can be formed of a coating material or a seal that absorbs light so as to reduce the reflectance of light. However, in a case where the surface of the flange 11*f* is low in reflectance of light, the markers $m_{bit}$, $m_{pt}$, and $m_{ST}$ can be formed by attachment of a film high in reflectance of light, such as a metal foil. Note that the outside of the markers $m_{bit}$, $m_{pt}$, and $m_{ST}$ is a region excluding the markers $n_{bit}$, $m_{pt}$, and $m_{ST}$ from the circular ring about the rotation axis including at least the sensing positions 41 and 42 for the first sensor and the second sensor. For example, the markers $m_{bit}$, $m_{pt}$, and $m_{ST}$ formed of a metal foil on a black sheet having such an annular shape may be attached to the flange 11*f*.

In a case where the sensor 4 is a distance sensor, the markers $m_{bit}$, $m_{pt}$, and $m_{ST}$ of the spool 11 are protrusions or recesses on the surface of the flange 11*f* or holes penetrating the flange 11*f*. Alternatively, in a case where the diameter of the flange 11*f* is sufficiently larger than the maximum outer diameter $D_{on}$ of the long member 7 and the markers $m_{bit}$, $m_{pt}$, and $m_{ST}$ can be disposed outside the maximum outer diameter $D_{on}$ in side view, a transmissive photosensor is applicable to the sensor 4. In this case, the markers $m_{bit}$, $m_{pt}$, and $m_{ST}$, can be holes penetrating the flange 11*f*. Alternatively, the flange 11*f* may be formed of a transparent plate material, and the markers $m_{bit}$, $m_{pt}$ and $m_{ST}$ may be formed of a coating material or a seal that blocks light. Alternatively, in a case where the surface of the flange 11*f* is formed of a conductive material such as metal, the markers $m_{bit}$, $m_{pt}$, and $m_{ST}$ can be formed of an insulating film, and a conduction probe is applicable to the sensor 4.

Such a marker $m_{bit}$ is a bit marker (information-detection bit marker) indicating information regarding the long member 7 binary encoded as N bits (N≥2), and not more than N number of markers $m_{bit}$ are provided. The information regarding the long member 7 includes, for example, the model number, the manufacturing number, the width, the thickness t, and the total length $L_{on}$ of the long member 7. The marker $m_{pt}$ is an index of the rotation amount of the spool 11 and is a point marker (information-detection point marker) indicating a position where the presence or absence of the bit marker no is determined, and N number of markers in are provided. The marker $m_{ST}$ is a start point marker (information start-point marker) for indicating the order of digits of the bit marker $m_{bit}$, and a single marker $m_{ST}$ is provided. All the bit markers $m_{bit}$ are disposed along the circumference to be equal to each other in distance from the rotation axis are Similarly, all the N number of point markers $m_{pt}$, are disposed along the circumference so as to be equal in distance from the rotation axis and so as not to overlap the bit markers $m_{bit}$ in distances from the rotation axis. The start point marker $m_{ST}$ is disposed so as not to overlap the point markers $m_{pt}$. Further, in the present embodiment, the start point marker $m_{ST}$ is disposed the same in distance from the rotation axis as the bit markers $m_{bit}$. Specifically, the point markers $m_t$ are disposed on the same circumference as the sensing position 41 for the first sensor of the sensor 4 of the conveying device 10, and the bit markers $m_{bit}$ and the start point marker $m_{ST}$ are disposed on the same circumference as the sensing position 42 for the second sensor. In FIG. 3, the point markers $m_{pt}$ are disposed on the innermost circumference, but the disposition order from the rotation axis is not defined.

In a case where the circular flange 11*f* (the one side of the spool 11) about the rotation axis is circumferentially divided into N (N≥2) number of divided regions that are equal to each other and are fan-shaped having a central angle (360°/N), the point markers $m_{pt}$ are each disposed in one of the N number of divided regions so as to be spaced apart from each other. In FIG. 3, N is simply indicated as N=16. In other words, the point markers $m_{pt}$ are disposed one-to-one along N number of radii that divide the flange 11*f* into the N number of divided regions equal to each other. Because the point markers $m_{pt}$ are evenly disposed along the circumference in such a manner, the point markers $m_{pt}$ can indicate the position where the presence or absence of the bit markers mw is determined as described above, and the rotation amount of (rotational angle) of the spool 11 can be measured on a (1/N) rotation basis. Each of the point markers $m_{pt}$ has a dimension detectable by the sensor 4 (first sensor) and has no shape defined, and is a rectangle that is long along the radius in FIG. 3. A gap between point markers $m_{pt}$ (circumferentially adjacent to each other) in adjacent divided regions is set to a length such that the sensor 4 does not erroneously detect the gap (that is, it is determined that there is no marker). The longer the distance from the rotation axis and the smaller N, that is, the smaller the number of the point markers $m_{pt}$ the longer the length (hereinafter, width) in the direction along the circumference (direction orthogonal to the radius) and the gap between the point markers $m_{pt}$ circumferentially adjacent to each other can be designed. However, when the point markers $m_{pt}$ are longer in distance from the rotation axis, the time during which a single point marker $m_{pt}$ passes the sensing position for the first sensor becomes shorter with respect to the rotation rate of the spool 11. Therefore, the sensor 4 is difficult to perform detection depending on the sampling speed and the response time of the sensor 4. From these points of view. N number of bits of the information indicated by such a bit marker n and the diameter of the flange 11*f* (distance from the rotation axis at which the point marker $m_{pt}$ can be disposed) are preferably set according to the highest rotation rate of the feeding roller 21 (spool 11) of the conveying device 10 and the response time of the sensor 4.

The bit markers $m_{bit}$ are disposed one-to-one in 0 to the N number of the divided regions. Further, as illustrated in FIG. 3, such a bit marker $m_{pt}$ is preferably arrayed along one of the N number of radii (one is indicated by a one-dot chain line) with the point marker $m_{pt}$, disposed in the same divided region, that is, the bit marker mw is preferably the same in orientation based on the rotation axis. A divided region where the bit marker $m_{bit}$ is disposed is defined as "1" and a divided region where no bit marker $m_{bit}$ is disposed is defined as "0". The bit markers $m_{bit}$ are disposed corresponding to the N-bit encoded information in order from the first digit in the counterclockwise direction. The bit markers n are circular in FIG. 3, and the shape thereof is not defined similarly to the point markers $m_{pt}$. The bit markers $m_{bit}$, however, preferably have dimensions detectable by the sensor 4 (second sensor), and are preferably longer in width than the point markers $m_{pt}$ in order to prevent detection omission. However, a gap between bit markers $m_{bit}$ disposed in adjacent divided regions (in assumption) is set to a length such that the second sensor does not erroneously detect the gap (that is, it is determined that there is no marker). Note that the bit markers $n_{bit}$ and the point markers $m_{pt}$ may overlap with each other in distance from the rotation axis if the bit markers nq and the point marker $m_{pt}$ are outside the sensing regions of the first sensor and the second sensor (annular ring about the rotation axis including the sensing positions 41 and 42).

In order to indicate the first digit (on the one-dot chain line in FIG. 3) of the N-bit bit markers $n_{bit}$, the start point marker $m_{ST}$ is disposed at the boundary between the divided regions in which the bit markers $m_{bit}$ of the first digit and the bit marker n of the N-th digit are disposed or not disposed. Specifically, the start point marker $m_{ST}$ is preferably disposed at the orientation based on the rotation in the middle (center) of the respective orientations of the point markers n of these two divided regions. Because the start point marker $m_{ST}$ is detected by the second sensor common to the bit markers $m_{bit}$ the start point marker $m_{ST}$ is disposed the same in distance from the rotation axis as the bit markers $m_{bit}$. Such a start point marker $m_{ST}$ may be in succession with the bit markers $m_{bit}$, disposed in the two divided regions (in assumption). In FIG. 3, the start point marker $m_{ST}$ has a rectangular shape that is long along the radius similarly to the point markers $m_{pt}$, but the shape of the start point marker $m_{ST}$ is not defined and may have a dimension detectable by the sensor 4 (second sensor).

As indicated by a two-dot chain line in FIG. 3, because the long member 7 is wound in a clockwise spiral shape in side view from the flange 11*f*, the spool 11 rotates clockwise as illustrated in FIG. 1 in feeding of the long member 7. Therefore, the spool 11 is provided with 16-bit (N=16) information (hereinafter, an information string) counterclockwise in order from the bit marker $m_{bit}$ of the first digit. In FIG. 3, "0011 0000 0011 1001" is given from the disposition of the start point marker $m_{ST}$ When the information string results from an encoded decimal numerical value, the information string represents "12345" in decoding. Further, for example, an alphabetical character can be encoded by 5 bits, or can be encoded by ASCII (American Standard Code for Information Interchange).

The flange 11*f*' of the spool 11 may also be provided with markers $m_{bit}$, $m_{pt}$ and $m_{ST}$ similarly to the flange 11*f* of the spool 11. With such a configuration, the sensor 4 of the conveying device 10 can be disposed with respect to the spool 11 on the far side in drawing plane in FIG. 1. If the spool 11 can hold the long member 7, the spool 11 may include the body 11*b* without the flanges 11*f* and 11*f*'. In this case, any of the side faces, that is any of the bottom faces of the body 11*b* of the spool 11 is provided with markers $m_{bit}$, $m_{pt}$, and $m_{ST}$.

The winding spool 12 is a jig for conveying the long member 7 in the conveying device 10, and is a member for winding and collecting the long member 7 having been processed or used. Similarly to the body 11*b* of the spool 11, the winding spool 12 has a cylindrical outer shape and a through hole through which the winding roller 22 of the conveying device 10 is inserted and fit. The winding spool 12 may have a flange similarly to the spool 11. Further, the spool 11 may be externally fitted to the winding roller 22, as the winding spool. The front end of the innermost circumference of the long member 7 is fixed to the spool 12 with, for example, an adhesive tape, so that the long member 7 is wound due to rotation of the winding spool 12.

(Cleaning Device)

The wiping member (long member) 7 comes into contact with the nozzle face of the inkjet head 9 of the image forming apparatus to wipe off the ink remaining on the nozzle face after printing. For the wiping, a cloth (woven fabric) or a nonwoven fabric with water absorbency is applied to the wiping member 7. In order for the wiping member 7 coming into contact with the entire nozzle face (region including the opening of the nozzle) of the inkjet head 9, the wiping member 7 has a band shape longer in width than the nozzle face in the conveyance width direction. Further, the wiping member 7 is a member to be conveyed of the conveying device 10. The conveying device 10 collects, as a used portion, a portion of the wiping member to which the ink is adhered due to contact with the nozzle face and conveys an unused portion of the wiping member 7 so as to face the nozzle face. The wiping member 7 is preferably a long member in order to reduce the frequency of replacement in the cleaning device 70 (image forming apparatus).

As illustrated in FIG. 1, the backup member 8 is a component disposed below the nozzle face of the inkjet head 9 so as to face the nozzle face with the wiping member 7 interposed between the backup member 8 and the nozzle face. The backup member is attached to a lifting mechanism (not illustrated), and moves up and down as shown by a double-headed arrow. With the backup member 8 at the downward position (at the standby position), the wiping member 7 is stretched across the guide rollers 62 and 63 and spaced apart from the backup member 8 and the nozzle face of the inkjet head 9 as illustrated in FIG. 1. When the backup member 8 moves upward, the backup member 8 lifts the wiping member 7 from below and presses the wiping member 7 against the nozzle face of the inkjet head 9 to bring the wiping member 7 into contact with the nozzle face of the inkjet head 9. Depending on, for example the material and thickness of the wiping member 7, the backup member 8 is preferably an elastic member such as sponge or rubber so as not to damage the nozzle face of the inkjet head 9. In order for the wiping member 7 coming into contact with the entire nozzle face, the upper face of the backup member 8 preferably has a dimension equal to or larger than the nozzle face, and preferably has a length in the conveyance width direction equal to or larger than the width of the wiping member 7.

The cleaning device 70 may have a configuration to bring the wiping member 7 impregnated with a cleaning liquid into contact with the nozzle face of the inkjet head 9. Therefore, the cleaning device 70 includes a mechanism (not illustrated) that supplies the cleaning liquid, and causes the cleaning liquid to be permeate into the wiping member 7 between the guide rollers 61 and 62, for example.

(Operation of Cleaning Device)

The cleaning device 70 performs a cleaning operation when a predetermined condition such as performing of printing (image forming processing) once or a predetermined number of times is satisfied in the image forming apparatus. When no cleaning operation is being performed, as illustrated in FIG. 1, the wiping member 7 of the cleaning device 70 is spaced apart from the nozzle face of the inkjet head 9, and the portion (between the guide rollers 62 and 63) facing the nozzle face of the wiping member 7 is not unused. Further, the conveying device 10 remains stopped (standby state).

When the above condition is satisfied in the image forming apparatus, the cleaning operation is performed. The cleaning device 70 raises the backup member 8 to press the wiping member 7 between the guide rollers 62 and 63 against the nozzle face of the inkjet head 9. When a predetermined time has elapsed, the backup member 8 is lowered and returned to the standby position. Finally, the conveying device 10 is operated to convey the wiping member 7. The portion of the wiping member 7 in contact with the nozzle face is moved to outward (downstream) the region immediately below the nozzle face. The conveying device 10 is stopped and the operation of the cleaning device 70 is completed.

The cleaning device 70 may perform cleaning of the nozzle face of the inkjet head 9 at the same portion of the wiping member 7 twice or more a predetermined number of times. In this case, the cleaning device 70 counts the number of times of cleaning of the nozzle face (number of times of upward-and-downward reciprocation of the backup member 8) since the last operation of the conveying device 10. While the number of times does not reach the predetermined number, the backup member 8 is returned to the standby position, and then the operation of the cleaning device 70 is completed. When the counted number of times reaches the predetermined number of times, the conveying device 10 coveys the wiping member 7 as described above, and then the cleaning operation is completed.

The cleaning device 70 may cause the wiping member 7 to slide on the nozzle face of the inkjet head 9 to wipe off the ink. In this case, for example, the conveying device 10 conveys the wiping member 7 by a predetermined distance with the wiping member 7 in contact with the nozzle face resulting from raising of the backup member S. The backup member S has a structure easily slidable with respect to the wiping member 7 or is a driven roller having an elastic member on its peripheral face and an outer diameter allowing the wiping member 7 to come into contact with the entire nozzle face.

(Method of Detecting Remaining Amount of Long Member and Method of Reading Information)

Figure 4A:
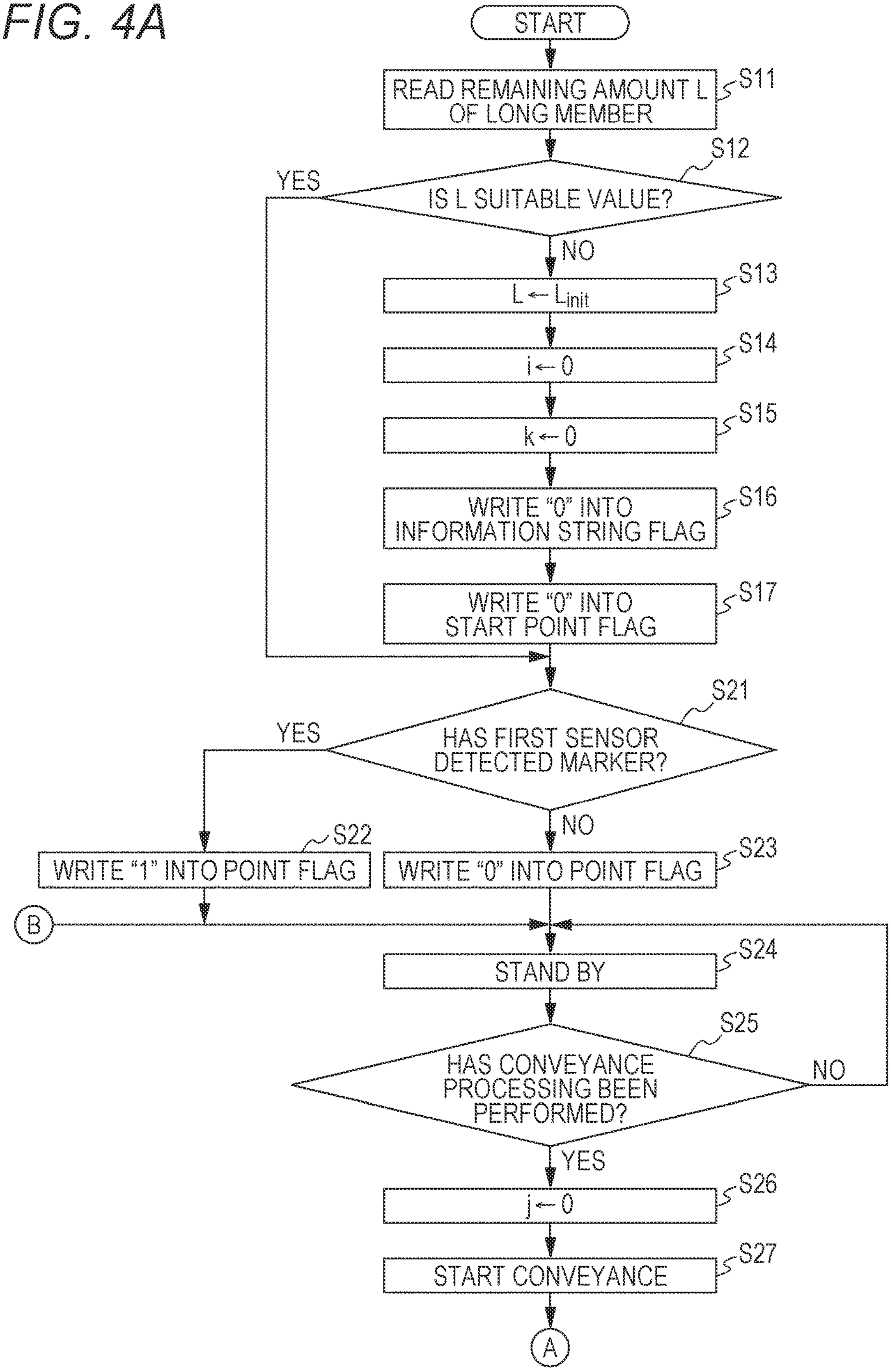
FIG. 4A is a flowchart illustrating a method of detecting the remaining amount of a long member and a method of reading information with which the spool illustrated in FIG. 2 is provided, by the conveying device.
Figure 4B:
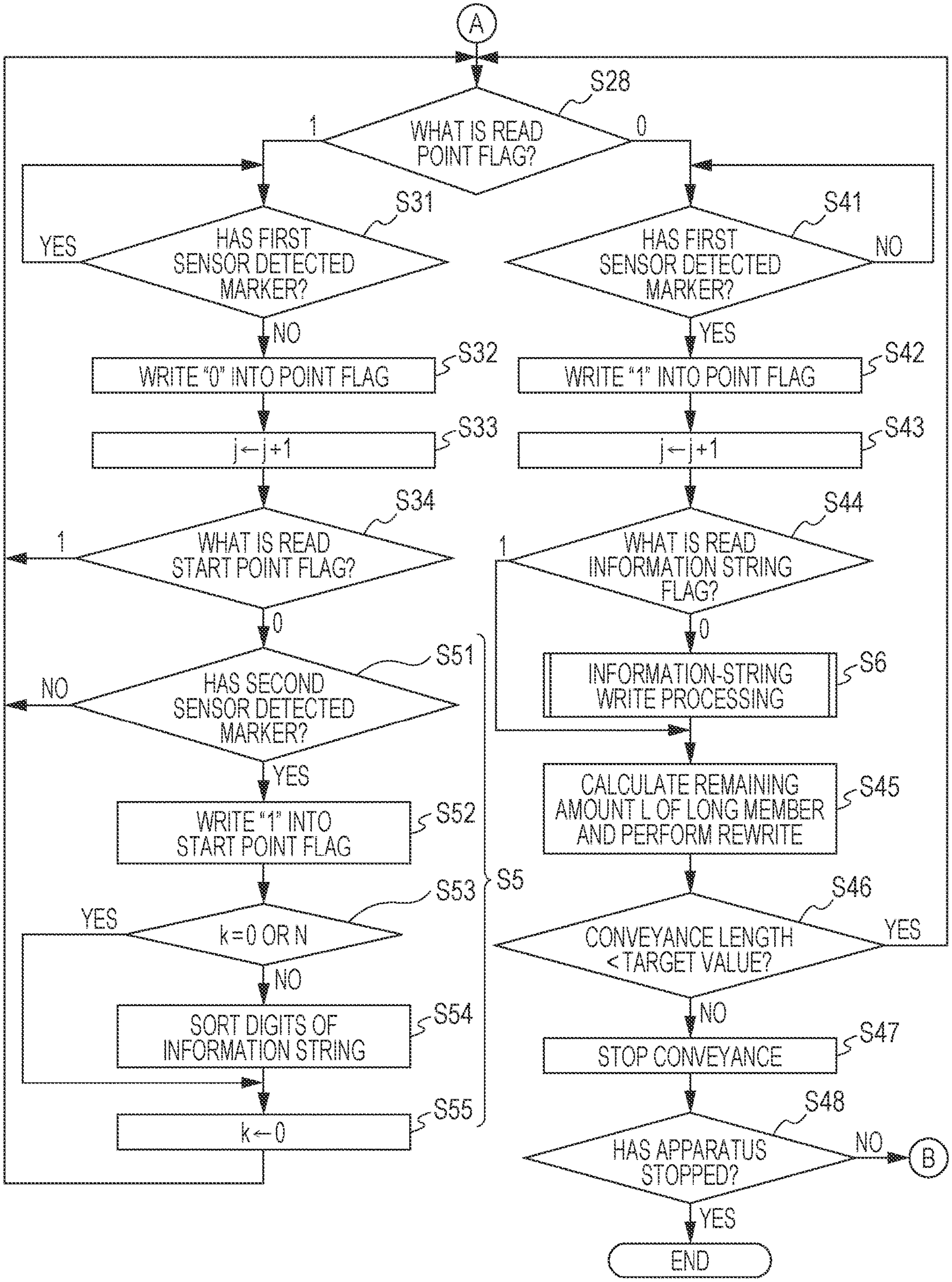
FIG. 4B is a flowchart illustrating the method of detecting the remaining amount of the long member and the method of reading the information with which the spool illustrated in FIG. 2 is provided, by the conveying device.
Figure 4C:
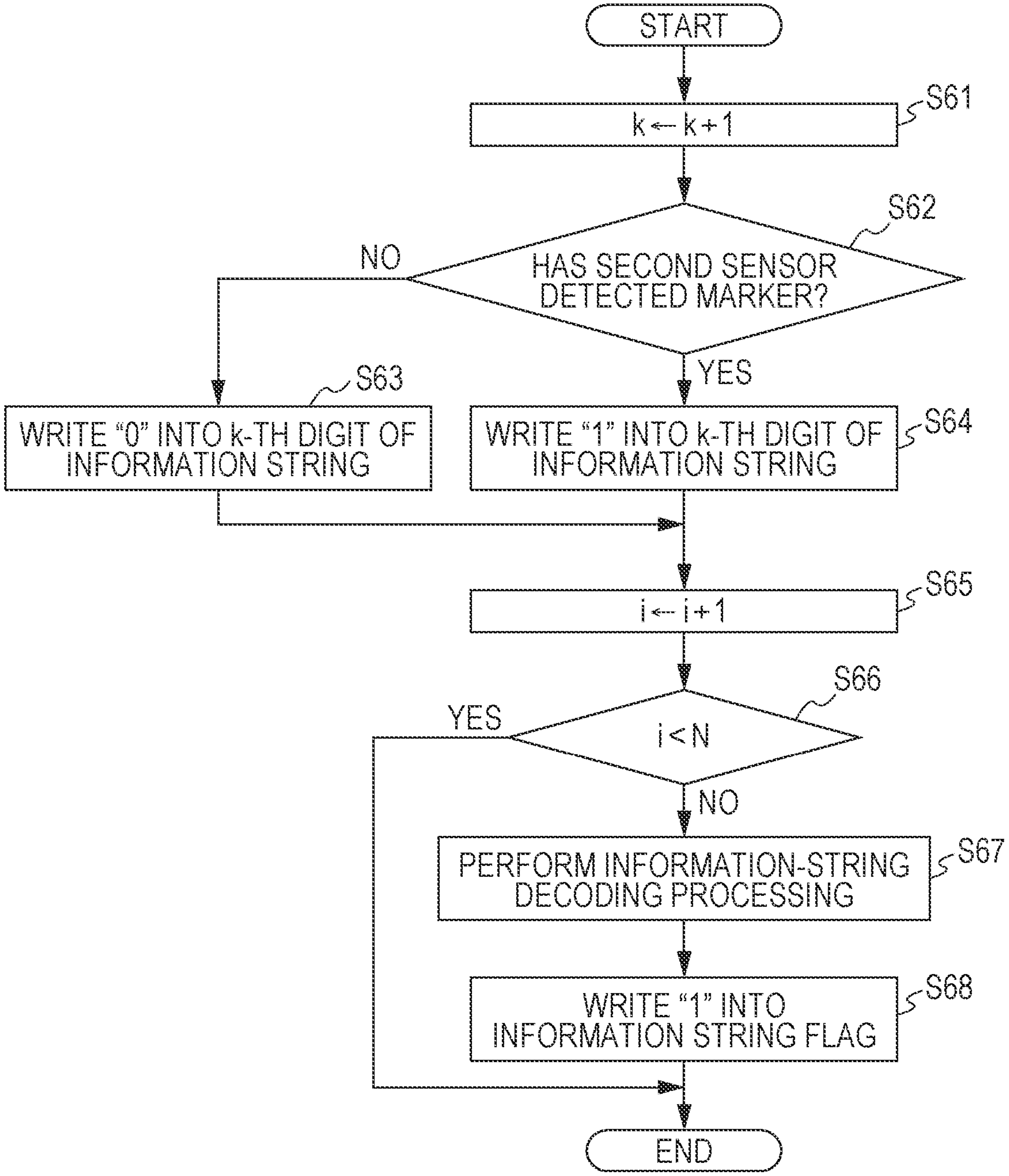
FIG. 4C is a flowchart illustrating the method of detecting the remaining amount of the long member and the method of reading the information with which the spool illustrated in FIG. 2 is provided, by the conveying device.

With reference to FIGS. 1, 3, 4A, 4B, and 4C, description will be given of a method of detecting the remaining amount of a long member and a method of reading binary-encoded information given to the spool that supplies the long member in conveyance of the long member by the conveying device according to the first embodiment. FIGS. 4A to 4C are flowcharts illustrating the method of detecting the remaining amount of the long member and the method of reading the information by the conveying device according to the first embodiment. Here, described will be the first operation after a new cartridge of the long member 7 (long member 7 wound around the spool 11) is attached to the feeding roller 21 of the conveying device 10 (image forming apparatus).

When the image forming apparatus equipped with the conveying device 10 is activated, the conveying device 10 is in a state where the power source such as the motor 3 is remaining stopped, and the controller 5 reads the remaining amount L of the long member 7 (length of the portion wound around the spool 11) from the memory incorporated in the controller 5 (S11). As described above, it is immediately after the replacement of the long member 7 with the new cartridge. Thus, the remaining amount L of the long member 7 is reset and cannot be read, or a small value immediately before replacement is read (S12; NO). Therefore, an initial value $L_{init}$ is input as the remaining amount L (S13). The initial value $L_{init}$ is obtained by subtracting the length of the conveyance path between the rollers 21 and 22 of the conveying device 10 (through the guide rollers 61 to 64) from the total length $L_{on}$ of the cartridge of the long member 7. Further, a point counter i and a bit counter k are each initialized to 0 (S14 and S15), and "0" is written into an information string flag and a start point flag so as to be released (S16 and S17). The counters i and k are set to read the information string given to the spool 11.

Next, the first sensor of the sensor 4 performs marker detection. The first sensor detects a point marker $m_{pt}$ (see FIG. 3). When the point marker $m_{pt}$ has been detected (S21; YES), "1" is written into the point flag (S22). Otherwise, when no point marker $m_{pt}$ has been detected (S21; NO), "0" is written (S23). Thereafter, the conveying device 10 stands by until conveyance processing is performed in the image forming apparatus (conveyance stop is continued) (S25; NO and S24).

When the conveying device 10 receives an instruction to perform the conveyance processing (S25; YES), the controller 5 initializes a rotation amount counter j to 0 (S26), and then the motor 3 and others start driving and the conveying device 10 starts to convey the long member 7 (S27). The rotation amount counter j measures the rotation amount of the spool 11 in one conveyance of the long member 7 (including intermittent conveyance by the stepping motor), and counts one for every (½N) rotation of the spool 11. While the conveying device 10 is conveying the long member 7, the first sensor performs marker detection (S31 and S41).

When the point flag written before the start of conveyance is "I" (S22 and S28; 1), that is, when the point marker $m_{pt}$ is detected at the position of the spool 11 before the start of conveyance (S21; YES), the detection is continued until the first sensor no longer detects a marker (it is determined that there is no marker) (S31). The first sensor no longer detects a marker due to movement of the point marker $m_{pt}$ with respect to the first sensor resulting from rotation of the spool 11 (S31; NO), the point flag is rewritten to "0" (S32), and the rotation amount counter j is incremented (S33). Next, because the start point flag is "0" (S17 and S34; 0), start-point detection processing (S5) is performed. First, the second sensor of the sensor 4 performs marker detection (S51). At this time, the second sensor detects the start point marker $m_{ST}$ (see FIG. 3). When the second sensor has not been detected the marker (S51; NO), the start-point detection processing (S5) ends. Because the point flag is "0" (S32 and S28; 0) this time, the second sensor continues the detection until the first sensor detects a marker (S41).

As described above, when the point flag written before the start of conveyance is "0" (S23 and S28; 0) due to the rotation of the spool 11 or immediately before the start of conveyance, that is, when no point marker $m_{pt}$ has been detected at the position of the spool 11 before the start of conveyance (S21; NO), the second sensor continues the detection until the first sensor detects a marker (S41). When the first sensor detects a marker due to movement of the point marker $m_{pt}$ with respect to the first sensor resulting from rotation of the spool 11 (S41; YES), the point flag is rewritten to "1" (S42), and the rotation amount counter j is incremented (S43). Next, because the information string flag is "0" (S16 and S44; 0), information-string write processing (S6) is performed.

In the information-string write processing (S6), first, the bit counter k is incremented (S61). Next, the second sensor performs marker detection (S62). At this time, the second sensor detects a bit marker mi (see FIG. 3). When no marker has been detected (S62; NO), "0" is written into the k-th digit of the information string (S63). Otherwise, when the marker has been detected (S62; YES), "1" is written (S64). Then, the point counter i is incremented (S65). When the point counter i is less than N (S66; YES), the information-string write processing (S6) ends without any processing.

After the information-string write processing (S6), the remaining amount L of the long member 7 is calculated to be rewritten (S45). In the present embodiment, because the rotational angle (360°×j/2 N) of the spool 11 from the start of conveyance (S27) is measured by the rotation amount counter j, the remaining amount L can be calculated by a known method (e.g., JP No. 5527016, 3). Specifically, for the long member 7, the remaining amount, that is, the winding length L, the winding diameter (outer diameter) D ($D_{on}$ in FIG. 2), the inner diameter d, and the thickness t at the spool 11 are expressed by Expression (1) below.

$$L=(D^2\text{-}d^2)\times\pi/(2^2\times t) \tag{1}$$

The inner diameter d represents the outer diameter of the body 11*b* of the spool 11 (see FIG. 2). If the total length $L_{on}$ of the long member 7 (cartridge) before being attached to the conveying device 10 (image forming apparatus) is known, the outer diameter $D_{on}$ can be measured to calculate the accurate thickness t in the wound state. Therefore, Expression (1) is a relational expression between the remaining amount L and the outer diameter D with the inner diameter d and the thickness t as constants. With Expression (1), the outer diameter $D_{init}$ can be calculated on the basis of the initial remaining amount $L_{init}$ of the long member 7 attached to the conveying device 10, so that the long member 7 has a length ($\pi\times D_{init}$) of a round of the outermost circumference of the spool 11. When the length of the conveyance path between the rollers 21 and 22 of the conveying device 10 is relatively sufficiently short, the result may be approximated as $L_{init}\approx L_{on}$ and $D_{init}=D_{on}$.

While the conveyance length (the reduction length of the remaining amount L) from the start of conveyance of the long member 7 (S27) does not reach a target value (S46; YES), the first sensor performs detection again. Here, because the point flag is set to "1" (S42 and S28; 1), the detection is continued until the first sensor no longer detects a marker (S31). Otherwise, when the conveyance length reaches a target value (S46; NO), the conveyance is stopped (S47). Further, when the image forming apparatus is stopped (S48; YES), the flow ends. Otherwise (S48; NO), the conveying device 10 stands by (S24) until conveyance processing is performed again (S25; YES). Further, when the image forming apparatus is activated again after the image forming apparatus is stopped (S48; YES), the remaining amount L of the long member 7 is read similarly to the previous time (S11). In the second and subsequent times, a suitable value is read (S12; YES). The first sensor of the sensor 4 performs marker detection with the counters i and k, the information string flag, and the start point flag as the values immediately before the previous stop of the image forming apparatus (S21).

Further, in the start-point detection processing (S5), when the second sensor has detected the start point marker $m_{ST}$ (S51; YES). "1" is written into the start point flag (S52), that is, the start point flag is set. At this time, when the bit counter k is not 0 or N (step S53; NO), the previously written digits of the information string are sorted on the basis of the bit counter k (S54). Then, the bit counter k is initialized to 0 (S55), and the start-point detection processing (S5) ends.

In such a manner, every time the first sensor of the sensor 4 makes a switch from marker detection to marker non-detection or vice versa, the point flag is rewritten (S32 and S42), the rotation amount counter j is incremented (S33 and S43), and the second sensor performs marker detection (S51 and S62). However, when the first sensor has detected a marker (point marker $m_{pt}$) (S41; YES), the second sensor detects the bit marker n and one digit of the information string is written (S6). Further, the remaining amount L of the long member 7 is calculated (S45), and the conveyance length is determined (S46). Otherwise, when the first sensor has detected no marker (S31; NO), the second sensor detects the start point marker $m_{ST}$. When the second sensor has detected the start point marker $m_{ST}$ once (S51; YES), the start point flag is set (S52). Thus, the start-point detection processing (S5) is not performed after the set of the start point flag (S34; 1).

Further, when the information-string write processing (S6) is performed N number of times, all the N digits of the information string are written and the point counter i reaches N (S66; NO). The information string can be decoded (S67). Then, "1" is written into the information string flag (S68), that is, the information string flag is set and the information-string write processing (S6) ends. Thereafter, even when the first sensor makes a switch from marker non-detection to marker detection (S41; YES), information-string write processing (S6) is not performed (S44; 1). When the decoded information includes the total length $L_{on}$, of the cartridge of the long member 7, the controller 5 can feed back the total length $L_{on}$ to the remaining amount L.

In the present embodiment, the bit counter k is set. With this arrangement, regardless the position of the start point marker $m_{ST}$ due to the attachment posture (orientation) of the cartridge of the long member 7 to the conveying device 10, the information string given to the spool 11 is read to obtain the information regarding the long member 7 if the spool 11 makes one rotation. For the conveyance at the second and subsequent rotations of the spool 11, the remaining amount L and the conveyance length of the long member 7 are preferably measured (S45 and S46). According to the present embodiment, the spool 11 is provided with the point markers $m_{pt}$ together with the bit markers mw. With this arrangement, the remaining amount L and the conveyance length of the long member 7 can be measured each time the spool 11 rotates (360°/N), that is, with high frequency.

Further, the remaining amount L and the conveyance length of the long member 7 can be measured (S45 and S46)

at the time of making a switch to marker non-detection from marker detection of the first sensor of the sensor 4 (step S31; NO). Furthermore, such a measurement can be performed at the time of making a switch from marker detection to marker non-detection and at the time of making a switch from non-detection to detection (S31; NO, S41; YES). In this case, the width of the point markers $m_{pt}$ and the length of the gap between the point markers $m_{pt}$ circumferentially adjacent to each other are preferably closer to each other, and more preferably equal to each other.

The information-string write processing (S6) may start after the start point marker $m_{ST}$ is detected (S51; YES). Therefore, when the information string flag is "0" (S44; 0) and the start point flag is "1", the information-string write processing (S6) is performed. This method enables reading of the information string until the spool 11 makes two rotations at the maximum and eliminates the processing for the bit counter k and the sorting for the information string (S17, S53 to S55, and S61).

When the sensor 4 is disposed with respect to the spool 11 on the far side in drawing plane of FIG. 1, the spool 11 rotates counterclockwise in feeding the long member 7 in side view from the flange 11*f*. Therefore, in the information-string decoding processing (S67), "1" or "0" of each digit of the information string are sorted in descending order.

In the present embodiment, the controller 5 causes the memory, particularly the nonvolatile memory, to store the presence or absence of a bit marker $m_{bit}$ detected by the second sensor and the counters i and k. With this arrangement, all the N-digit bit markers $m_{bit}$ can be read and the information string can be decoded if the spool 11 makes one to two rotations in total without making one rotation in one conveyance (cleaning) of the long member 7, and further one activation of the image forming apparatus. Further, the detection of the bit marker $m_{bit}$ and the information-string decoding processing (S67) are not limited to be performed at the first time after the long member 7 is replaced with a new cartridge, and may be always performed during conveyance, or may be performed, for example, at the first time after activation of the image forming apparatus. If the information string given to the spool 11 includes information unique to the cartridge such as the serial number of the long member 7, it is understood that the cartridge has been replaced when the read information string is different from the information string at the previous time.

(Modification)

In a case where one conveyance length of the long member 7 is short and the frequency of conveyance is low, it takes time from when a new cartridge of the long member 7 is attached to the conveying device 10 to when the spool 11 makes one to two rotations, and the information given to the spool 11 cannot be read until then. Therefore, after the cartridge of the long member 7 is replaced and before the cleaning device 70 of the image forming apparatus performs cleaning, that is, before performing printing, the conveying device 10 continuously rotates the spool 11 one to two times to detect all the bit markers nu of the information string. At this time, the long member (wiping member) 7 may not be used for cleaning (the backup member 8 is not moved from the standby position), and measurement of the remaining amount L and the conveyance length of the long member 7 (S45 and S46) may be eliminated. After the information string is read, the spool 11 rotates reversely by the amount of rotation for the reading of the information string to return to the state at the time of attachment. Therefore, the conveying device 10 includes the feeding roller 21 rotationally driven by the motor like the winding roller 22.

Figure 5:
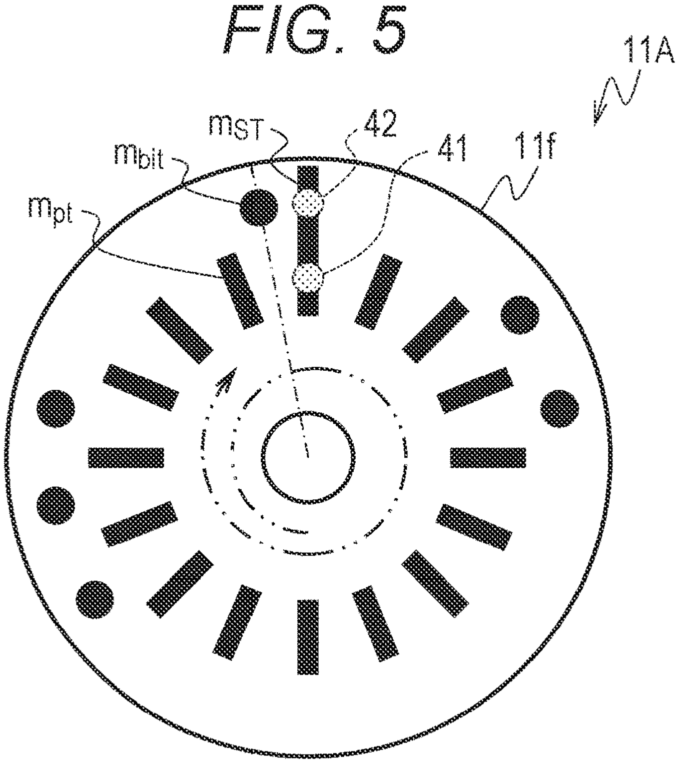
FIG. 5 is an explanatory side view of marker disposition on a spool according to a modification of the first embodiment of the present invention.

On the spool 11 according to the present embodiment, the bit markers $m_{pt}$ may be different in orientation based on the rotation axis from point markers $m_{pt}$. In other words, such a bit marker $m_{bit}$ is the same in orientation based on the rotation axis as a region interposed between the point markers $m_{pt}$ circumferentially adjacent to each other. FIG. 5 is an explanatory side view schematically illustrating a spool according to a modification of the first embodiment of the present invention. A spool 11A according to the modification of the first embodiment has a bit marker maw, and a start point marker $m_{ST}$ shifted by (360°/2N) with respect to the spool 11 according to the first embodiment illustrated in FIG. 3. On the spool 11A, the bit marker $m_{ST}$ is circumferentially shifted with respect to a point marker $m_{pt}$ while the start point marker $m_{ST}$ is disposed along in the same radial direction as the point marker $m_{pt}$. The start point marker $m_{ST}$ has an elongated rectangle and is connected to the point marker $m_{pt}$ in FIG. 5. The spool 11A can be similar in configuration to the spool 11 according to the first embodiment illustrated in FIG. 2 except for the disposition of markers $m_{bit}$, $m_{pt}$, and $m_{ST}$.

A long member 7 wound around the spool 11A according to the present modification is conveyed by such a conveying device 10 according to the embodiment illustrated in FIG. 1. As a result, similarly to the embodiment illustrated in FIGS. 4A to 4C, information string indicated by such bit markers $m_{bit}$ can be read while the remaining amount L and the conveyance length of the long member 7 is measured. In the present modification, processing when a first sensor of the sensor 4 makes a switch from marker detection to marker non-detection (S31; NO) and processing when the first sensor makes a switch from marker non-detection to marker detection (S41; YES) may be transposed.

In a case where the conveying device 10 does not use the point markers $m_{pt}$ for measuring the remaining amount L and the conveyance length of the long member 7, for example, in a case where only the start point marker $m_{ST}$ is used, the spool 11 or the spool 11A (hereinafter, collectively, the spool 11) may include a flange 11*f* with the point markers $m_{pt}$ not equally disposed thereon, that is, the divided regions are not necessarily equal to each other. On the other hand, equal disposition of the point markers $m_{pt}$ on the spool 11 allows the conveying device 10 to easily control the conveying speed (time required for conveyance of a predetermined conveyance length) as below, for example.

When the rotation rate (referring to the number of revolutions per unit time) of a winding roller 22 is constant, the conveying device 10 has a conveying speed for the long member 7 that changes to a high speed as the remaining amount L of the spool 11 decreases. The conveying device 10 can maintain constant the time required for a predetermined conveyance length of the long member 7, for example, with the following configuration. When the remaining amount L and the conveyance length of the long member 7 are measured (S45 and S46), the conveyance length per pulse is calculated on the basis of the number of pulses of a pulse signal for driving a motor 3 while the spool 11 rotates (360°/N), and the cycle of the pulse signal is changed in response to the result to adjust the time required for conveyance of the predetermined conveyance length.

Further, the conveying device 10 may include the first sensor and a second sensor of the sensor 4, respectively, at a sensing position 41 and a sensing position 42 that are not disposed along the diameter, and the first sensor and the second sensor of the sensor 4 can be circumferentially shifted from each other by an integral multiple of (360°/N). For example, in a case where the distance between the point markers $m_{pt}$, the bit markers $m_{bit}$, and the start point marker $m_{ST}$ are close in distance from the rotation axis on the spool 11 and it is difficult to dispose the first sensor and the second sensor along the diameter, either the first sensor or the second sensor may be circumferentially shifted (e.g., 180°). In other words, regardless of each dimension (area required for installation) of the first sensor and the second sensor, the respective distances of the point markers $m_{pt}$, the bit markers $m_{bit}$, and the start point marker $m_{ST}$ of the spool 11 from the rotation axis can be set.

Alternatively, the conveying device 10 may have a configuration such that the sensing position 41 for the first sensor and the sensing position 42 for the second sensor of the sensor 4 are detected at two or more locations symmetric with respect to the rotation axis as a point of symmetry. For example, detection is performed at two locations every 180°, three locations every 1200, or four locations every 90°. With such a configuration, in a case where detection is performed at two locations, the information string can be read by ½ rotation of the spool 11, and the information given to the spool 11 can be read at an early stage. Furthermore, if one location corresponds to an integer of N, that is, N=16, in a case where detection is performed, for example, at two locations or four locations, the first sensor for detecting the point markers $m_{pt}$ can be set to one location.

Second Embodiment

The conveying device according to the first embodiment, the first sensor and the second sensor of the sensor detect two locations, and a switch is made between the bit marker and the start point marker as a detection target of the second sensor to perform determination, in response to detection or non-detection by the first sensor that detects the point markers disposed in all the N number of divided regions. Therefore, the spool is provided with the bit markers and the start point marker that are the same in distance from the rotation axis. If a conveying device includes a sensor that can detect three locations, marker disposition on a spool can be made and processing in a method of reading information can be performed as below.

Figure 6:
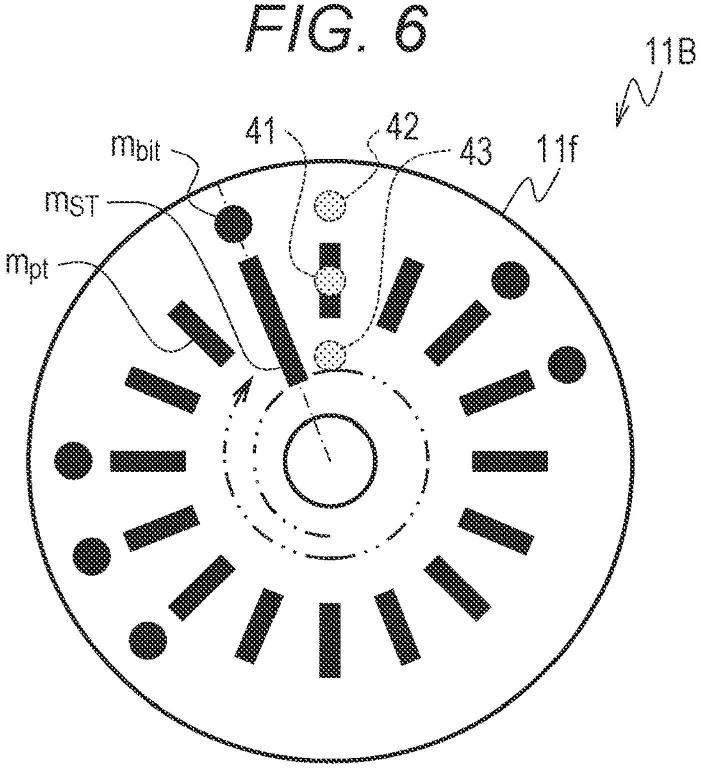
FIG. 6 is an explanatory side view of marker disposition on a spool according to a second embodiment of the present invention.

A conveying device 10 according to a second embodiment includes a sensor 4 including a first sensor, a second sensor, and a third sensor that can parallelly detect three locations different in distance from the rotation axis of a feeding roller 21. Other configurations are similar to those of the first embodiment (see FIG. 1). Corresponding to such a conveying device 10, a spool 11B according to the second embodiment has a flange 11*f* with which markers $m_{bit}$, $m_{pt}$, and $m_{ST}$ are provided as illustrated in FIG. 6. The spool 11 can be similar in configuration to the spool 11 according to the first embodiment illustrated in FIG. 2 except for the disposition of the markers $m_{bit}$, $m_{pt}$, and $m_{ST}$. FIG. 6 is a side view of the spool according to the second embodiment, and is a plan view of the flange for explaining the marker disposition.

(Spool)

On the spool 11B, similarly to the first embodiment, the point markers $m_{pt}$ and the bit markers $m_{bit}$ are different in distance from the rotation axis, and one of the bit markers $m_{bit}$ and the corresponding point marker $m_{pt}$ is along a radius (one is indicated by a one-dot chain line). The start point marker $m_{ST}$ is preferably different in distance from the rotation axis from the point markers $m_{pt}$ and the bit marker $m_{bit}$. The start point marker $m_{ST}$ is preferably disposed in the same divided region as the bit marker $m_{bit}$ indicating the first digit of an information string, and is preferably disposed with this bit marker $m_{bit}$ along the radius (one is indicated by the one-dot chain line) as illustrated in FIG. 6. In FIG. 6, the start point marker $m_{ST}$, the point markers $m_{pt}$, and the bit markers n are disposed on the flange 11*f* in the order of proximity from the rotation axis, but the disposition order from the rotation axis is not defined. Similarly to the first embodiment, the bit markers $m_{bit}$ each have a circular shape, the point markers mm and the start point marker $m_{ST}$ each have a rectangular shape long along the radius, but the shape is not defined and has dimensions detectable by the sensor 4. The start point marker $m_{ST}$ is disposed at a position detectable by the third sensor of the sensor 4, the point markers $m_{pt}$ are each disposed at a position detectable by the first sensor of the sensor 4, and the bit markers $m_{bit}$ are each disposed at a position detectable by the second sensor of the sensor 4. FIG. 6 illustrates a sensing position 41 for the first sensor, a sensing position 42 for the second sensor, and a sensing position 43 for the third sensor of the sensor 4. The spool 11 can be similar in configuration as the spool 11 according to the first embodiment illustrated in FIG. 2 except for the disposition of markers $m_{bit}$, $m_{pt}$ and $m_{ST}$. In FIG. 6, the information string indicated by the bit markers n; are the same as that of the spool 11 illustrated in FIG. 3.

(Method of Detecting Remaining Amount of Long Member and Method of Reading Information)

Figure 7:
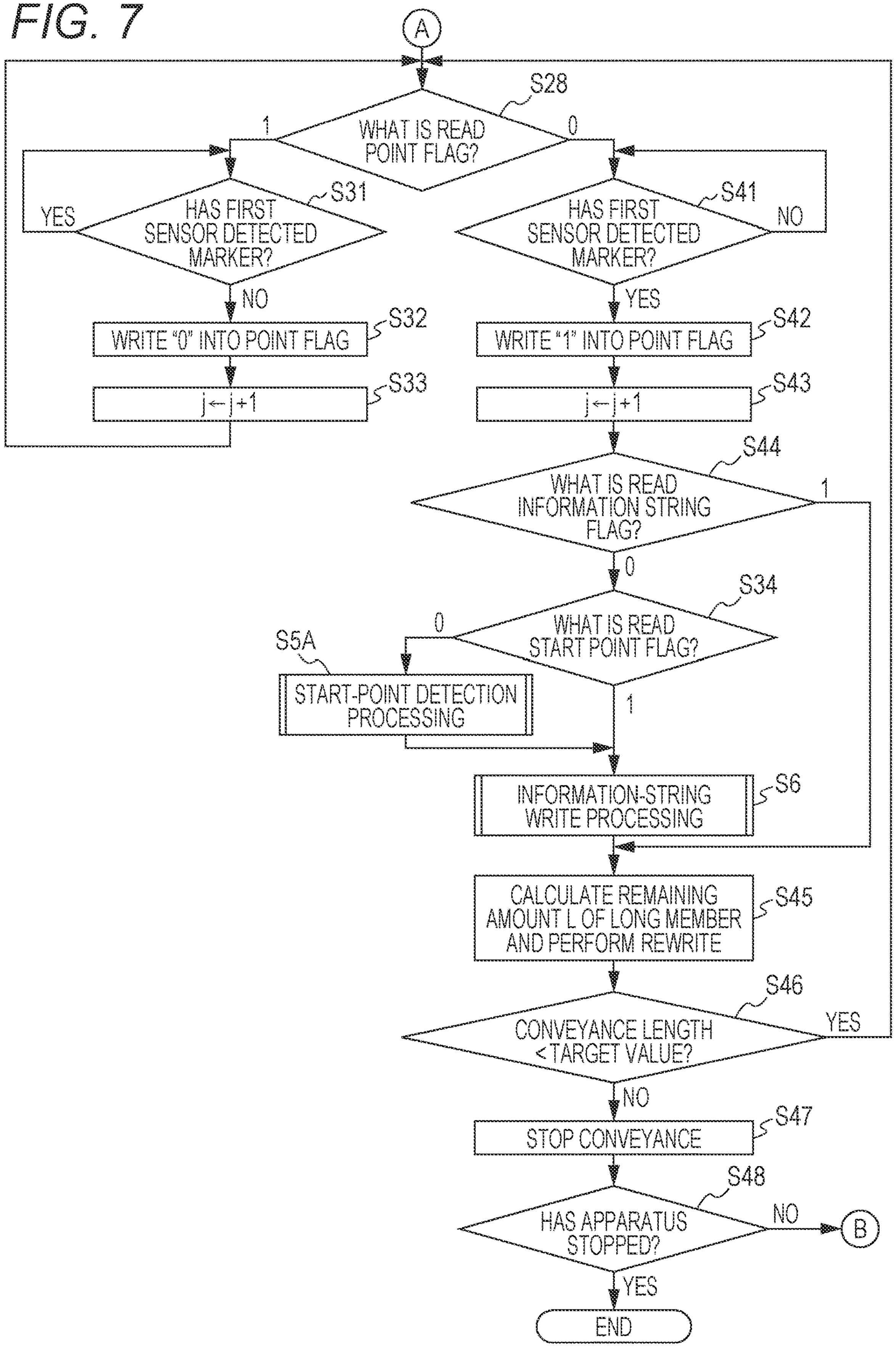
FIG. 7 is a flowchart illustrating a method of detecting the remaining amount of a long member and a method of reading information with which the spool illustrated in FIG. 6 is provided, by a conveying device.

With reference to FIGS. 6, 7, 4A, 4B, and 4C, description will be given of a method of detecting the remaining amount of a long member and a method of reading binary-encoded information given to the spool that supplies the long member in conveyance of the long member by the conveying device according to the second embodiment. FIG. 7 is a partial flowchart illustrating the method of detecting the remaining amount of the long member and the method of reading the information by the conveying device according to the second embodiment. FIG. 7 corresponds to FIG. 4B in the first embodiment. Hereinafter, a procedure different from that in the first embodiment will be described.

In the present embodiment, processing after the information string is read (S44; 1) is similar to that of the first embodiment. In processing before the information string is read (S44; 0), when the first sensor of the sensor 4 makes a switch from marker detection to marker non-detection (S31; NO), "0" is written into a point flag (S32) and a rotation amount counter j (S33) is incremented. Otherwise, when the first sensor makes a switch from marker non-detection to marker detection (S41; YES), a start point flag is read (S34) and start-point detection processing is performed (S5A) before information-string write processing (S6). In the present embodiment, the start-point detection processing (S5A) is similar in procedure to the start-point detection processing (S5) of the first embodiment illustrated in FIG. 4B, but the third sensor of the sensor 4 performs detection of the start point marker $m_{ST}$ (S51).

(Modification)

Figure 8:
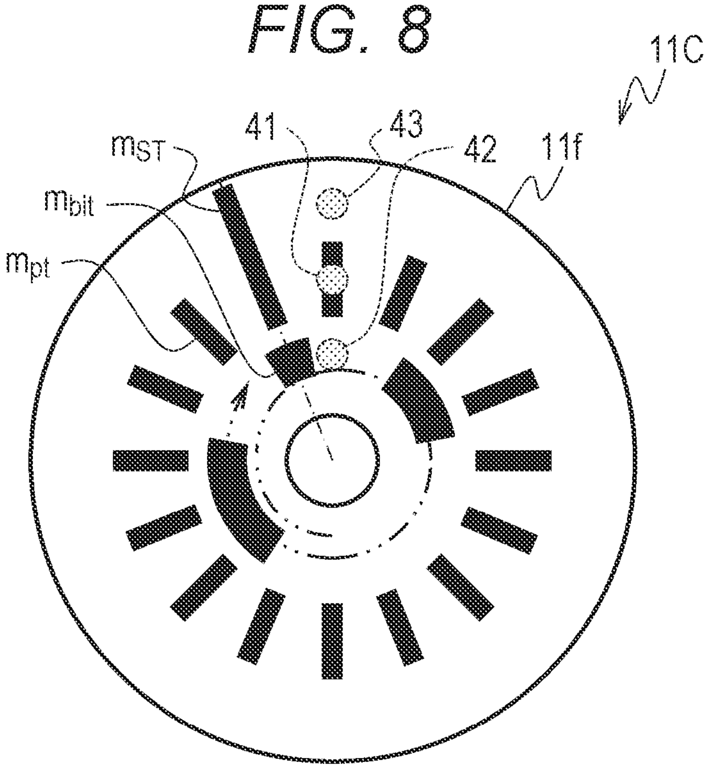
FIG. 8 is an explanatory side view of marker disposition on a spool according to a modification of the second embodiment of the present invention.

The spool 11B according to the present embodiment may be provided with no gap between bit markers $m_{bit}$ disposed in adjacent divided regions (in assumption). FIG. 8 is an explanatory side view of marker disposition on a spool according to a modification of the second embodiment of the present invention. On a spool 11C according to the modification of the second embodiment, bit markers $m_{bit}$ disposed in adjacent divided regions are in succession. On the spool 11C, such bit markers $m_{bit}$, point markers $m_{pt}$, and a start point marker $m_{ST}$ are disposed in the order of proximity from the rotation axis. The spool 11C can be similar in configuration to the spool 11 according to the first embodiment illustrated in FIG. 2 except for the disposition of markers $m_{bit}$, $m_{pt}$, and $m_{ST}$. In FIG. 8, information string indicated by the bit markers n is the same as those of the spools 11 and 11B illustrated in FIGS. 3 and 6.

On each of the spools 11B and 11C (hereinafter, collectively, the spool 11B) according to the present embodiment and the modification thereof, similarly to the spool 11 according to the first embodiment, the start point marker $m_{ST}$ may be different in orientation based on the rotation axis from the point markers no. In this case, the information string can be read following the procedure illustrated in FIGS. 4A, 4B, and 4C However, the third sensor of the sensor 4 performs detection of the start point marker $m_{ST}$ (S51). On the spool 11B, similarly to the spool 11A according to the modification of the first embodiment illustrated in FIG. 5, a bit marker $m_{bit}$ may be the same in orientation based on the rotation axis the rotation axis as a region interposed between the point markers m circumferentially adjacent to each other.

In a case where a conveying device 10 uses the start point marker $m_{ST}$, without the point markers $m_{pt}$ for measuring the remaining amount L and the conveyance length of the long member 7, the spool 11B may include a flange 11*f* on which the point markers $m_{pt}$ are not equally disposed, that is, the divided regions are not necessarily equal to each other, similarly to the first embodiment. On the other hand, equal disposition of the point markers m on the spool 11B enables the conveying device 10 to control the conveying speed with high accuracy as described in the first embodiment. Further, a sensing position 41 for a first sensor of sensor 4, a sensing position 42 for a second sensor of the sensor 4, and a sensing position 43 for the third sensor of the sensor 4 can be circumferentially shifted from each other by an integral multiple of (360°/N), and the sensing positions 41, 42, and 43 can be detected at two or more locations symmetric with respect to the rotation axis as a point of symmetry.

On the spool 11B according to the present embodiment, the bit markers $m_{bit}$ and the start point marker $m_{ST}$ are disposed in different in distance from the rotation axis, and the sensor 4 can parallelly detect the individual locations. In a case where the conveying device 10 uses the start point marker $m_{ST}$ for measuring the remaining amount L and the conveyance length of the long member 7, disposition of the bit markers $m_{bit}$ in the equally divided regions of the spool lie enables reading of the information string without a point marker $m_{pt}$. In this case, the conveying device 10 can preferably detect two locations with the second sensor and the third sensor of the sensor 4.

In response to detection of the start point marker $m_{ST}$ by the third sensor, a controller 5 counts the number of pulses of a pulse signal for driving a motor 3 from that point of time, and records detection or non-detection of a bit marker nu by the second sensor of the sensor 4 for each count. Then, in response to detection of the start point marker $m_{ST}$ by the third sensor, the controller 5 makes a pulse number counter into N number of equal divisions to obtain the information string on the basis of detection or non-detection of the bit marker $m_{bit}$ corresponding to each divided pulse.

Further, some consecutive digits (e.g., 8 bits) in the information string are set as a predetermined pattern indicating the start point, so that the bit marker $m_{bit}$ as the start point can be read without the start point marker $m_{ST}$. Therefore, the spool 11B is preferably provided with the bit markers nw, and the conveying device 10 can preferably detect one location with the sensor 4.

Third Embodiment

On each spool according to the first embodiment and the second embodiment, the markers equally circumferentially disposed each to be an index of the rotation amount are provided as the point markers indicating the respective positions of the digits of the information string. The presence or absence of a bit marker disposed at a constant distance from the rotation axis different from the distance of a point marker from the rotation axis is associated with "I" or "0" of each digit of the information string. However, the bit marker can also be used as an index of the rotation amount of the spool.

Figure 9:
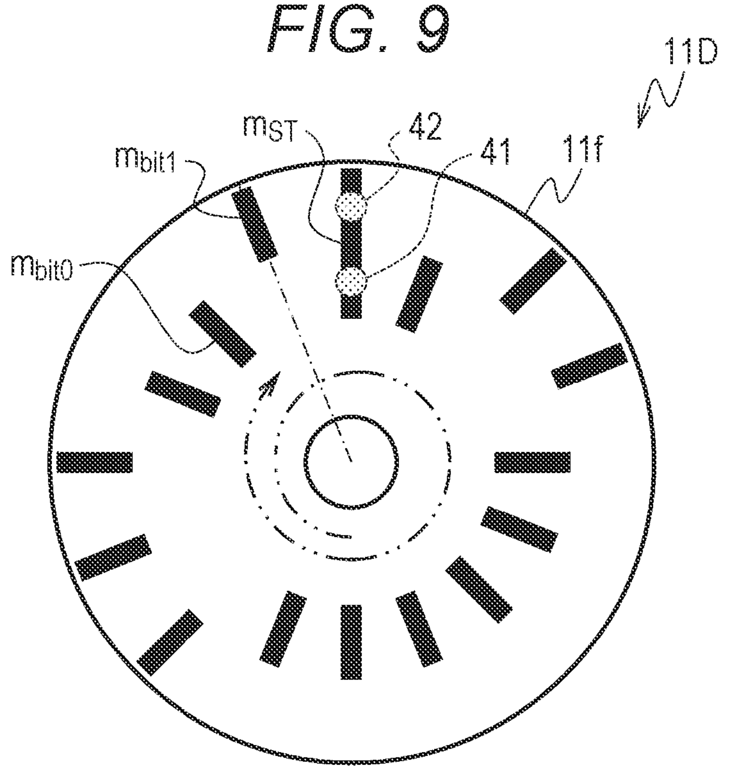
FIG. 9 is an explanatory side view of marker disposition on a spool according to a modification of a third embodiment of the present invention.

A conveying device 10 according to a third embodiment is similar in configuration as that of the first embodiment. A sensor 4 of the conveying device 10 can parallelly detect two locations different in distance from the rotation axis of the feeding roller 21. As illustrated in FIG. 9, a spool 11D according to the third embodiment includes a flange 11*f* provided with bit markers $m_{bit0}$ and $m_{bit1}$ and a start point marker $m_{ST}$. The spool 11D can be similar in configuration to the spool 11 according to the first embodiment illustrated in FIG. 2 except for the disposition of markers $n_{bit0}$, $m_{bit1}$, and $m_{ST}$. FIG. 9 is a side view of the spool according to the third embodiment, and is a plan view of the flange for explaining the marker disposition.

(Spool)

In a case where the flange 11*f* is divided into N number of divided regions equal to each other, either the bit markers $m_{bit0}$ or the bit markers $m_{bit1}$ are each disposed in one of (N−1) divided regions of the N number of divided regions. The bit markers $m_{bit0}$ are equal to each other in distance from the rotation axis and the bit markers $m_{bit1}$ are equal to each other in distance from the rotation axis, and the bit markers $m_{bit0}$ and the bit markers nu are different in distance from the rotation axis. The bit markers $m_{bit0}$ are disposed closer to the rotation axis in FIG. 9. Assuming that a divided region in which a bit marker $m_{bit0}$ is disposed is "0" and a divided region in which a bit marker $m_{bit1}$ is disposed is "1", each of the bit markers $m_{bit0}$ and $m_{bit1}$ is disposed corresponding to the (N−1)-bit encoded information in order from the first digit in the counterclockwise direction None of the bit markers $n_{bit0}$ and $m_{bit1}$ is disposed in one divided region corresponding to the N-th digit. The bit markers $m_{bit0}$ are each disposed at a position detectable by a first sensor of the sensor 4, and the bit markers n are each disposed at a position detectable by a second sensor of the sensor 4. FIG. 9 illustrates a sensing position 41 for the first sensor and a sensing position 42 for the second sensor of the sensor 4. Both of the bit markers $m_{bit0}$ and $m_{bit1}$ have dimensions detectable by the sensor 4, but the shape is not defined. The bit markers $m_{bit0}$ and $m_{bit1}$ are long rectangles along the radius in FIG. 9. A gap between bit markers $m_{bit0}$ disposed in adjacent divided regions and a gap between bit markers $m_{bit1}$ disposed in adjacent divided regions (in assumption) are each set to a length such that the sensor 4 does not erroneously detect the gaps (determined that there is no marker).

The start point marker $m_{ST}$ is disposed at a position simultaneously detectable by the first sensor and the second sensor of the sensor 4 in one divided region where no bit markers $m_{bit0}$ and $m_{bit1}$ are disposed. The start point marker $m_{ST}$ has a dimension detectable by each of the first sensor and the second sensor, and is a long rectangle along the radius in FIG. 9. The shape, however, is not defined, and may be separated into two between the sensing position 41 for the first sensor and the sensing position 42 for the second sensor. The start point marker $m_{ST}$ is set to a length such that the sensor 4 does not erroneously detect a gap between the start point marker $m_{ST}$ and a bit marker $m_{bit0}$ or a bit marker $m^{bit1}$ in which the bit marker $m_{bit0}$ and the bit marker $m_{bit1}$ are disposed one-to-one in divided regions on both sides of the divided region in which the start point marker $m_{ST}$ is disposed. The bit markers $m_{bit0}$ and $m_{bit1}$ and the start point marker $m_{ST}$ are preferably disposed one-to-one along N number of radii (one is represented by a one-dot chain line) that divide the flange 11*f* into the N number of divided regions equal to each other.

To the spool 11D, 15-bit (N=16) information string is given counterclockwise in order from the bit marker $m_{bit1}$ of the first digit. In FIG. 9, "011 0000 011 11001" is given from the disposition of the start point marker $m_{ST}$. When the information string results from an encoded decimal numerical value, the information string represents "12345" in decoding.

(Method of Detecting Remaining Amount of Long Member and Method of Reading Information)

With reference to FIGS. 9, 4A, 4B, 4C, and 7, description will be given of a procedure different from that in the second embodiment regarding a method of detecting the remaining amount of a long member and a method of reading binary-encoded information given to the spool that supplies the long member in conveyance of the long member by the conveying device according to the third embodiment.

In the present embodiment, during detection by the first sensor of the sensor 4 in the second embodiment, the second sensor parallelly performs detection (S21, S31, and S41) When the first sensor has detected a marker, "1" is written into a first point flag. Otherwise, the first sensor has detected no marker, "0" is written into the first flag. Similarly, when the second sensor has detected a marker, "1" is written into a second point flag. Otherwise, when the second sensor has detected no marker, "0" is written into the second flag. Then, every time one or both of the first sensor and the second sensor make a switch from marker non-detection to marker detection, a rotation amount counter j is incremented (S43). In the subsequent processing, performed are reading of a start point flag (S34), start-point detection processing (S5, and S5A), and information-string write processing (S6) before reading of the information string (S44; 0) as illustrated in FIG. 7. In the present embodiment, the start-point detection processing (S5 and S5A) includes detection of the start point marker $m_{ST}$ (step S51; YES) in a case where in the previous detection by the first sensor and the second sensor, the first sensor and the second sensor both make a switch from marker non-detection to marker detection. In the information-string write processing (S6), when the first sensor has detected a marker in the previous detection by the first sensor and the second sensor, "0" is written into the k-th digit of the information string, and when the second sensor had detected a marker in the previous detection by the first sensor and the second sensor, "I" is written into the k-th digit of the information string (S63 and S64).

(Modification)

Similarly to the second embodiment, in a case where a sensor 4 of a conveying device 10 can parallelly detect three locations different in distance from the rotation axis, on a spool 11D, a start point marker $m_{ST}$ can be disposed at a position different from other markers (bit markers $m_{bit0}$ and $m_{bit1}$) different in distance from the rotation axis, like the spool 11B illustrated in FIG. 6. Then, either bit markers $m_{bit0}$ or $m_{bit1}$ can be disposed one-to-one in all N number of divided regions corresponding to N-bit encoded information.

In the present embodiment, the bit markers $m_{bit0}$ and $m_{bit1}$ having two patterns in distance from the rotation axis can be used as indices of the rotation amount of the spool 11D like the point markers $m_{pt}$ in the first embodiment to measure the remaining amount L and the conveyance length of a long member 7. On the other hand, in case where the conveying device 10 uses the start point marker $m_{ST}$ for measuring the remaining amount L and the conveyance length of the long member 7, similarly to the first embodiment, the spool 11D may include a flange 11*f* on which the bit markers $n_{bit0}$ and $m_{bit1}$ and the start point marker $m_{ST}$ are not equally disposed, that is, the divided regions are not necessarily equal to each other. However, equal disposition of the bit markers $m_{bit0}$ and $m_{bit1}$ and the start point marker $m_{ST}$ on the spool 11D enables the conveying device 10 to control the conveying speed with high accuracy as described in the first embodiment. Further, a sensing positions 41 for a first sensor of the sensor 4 and a sensing position 42 for a second sensor of the sensor 4 can be circumferentially shifted from each other by an integral multiple of (360°/N), and the sensing positions 41 and 42 can be detected at two or more locations symmetric with respect to the rotation axis as a point of symmetry.

Fourth Embodiment

On each spool according to the first embodiment and the second embodiment, the markers equally circumferentially disposed each to be an index of the rotation amount are provided as the point markers indicating the respective positions of the digits of the information string, and the information string the same in number of digits (the number of bits) are represented by the bit markers ma. Further, the regions disposed between the point markers can also indicate the respective positions of the digits of the information string.

Figure 10:
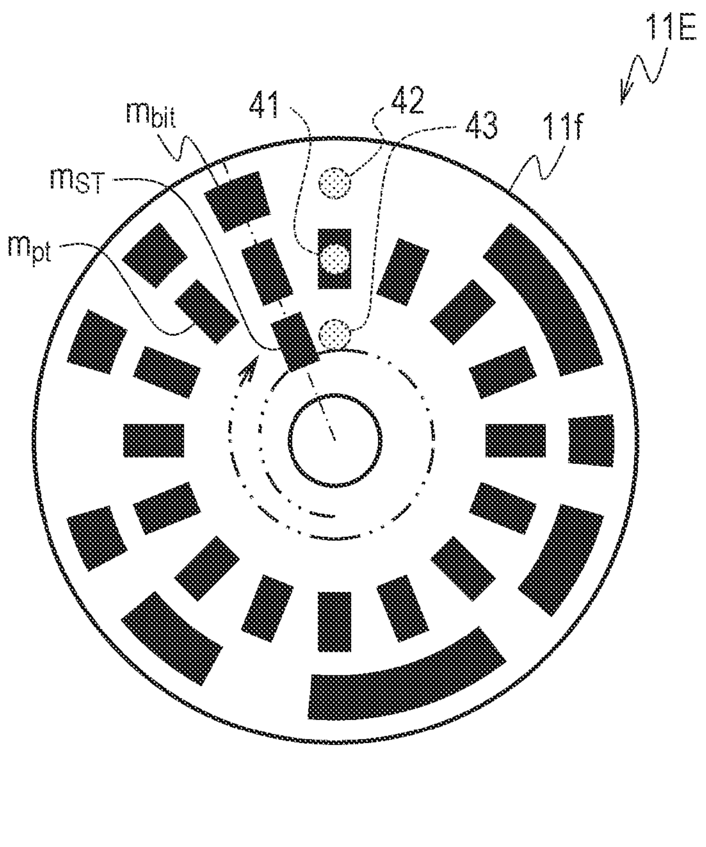
FIG. 10 is an explanatory side view of marker disposition on a spool according to a fourth embodiment of the present invention.

A conveying device 10 according to a fourth embodiment is similar in configuration as that of the second embodiment. A sensor 4 of the conveying device 10 can parallelly detect three locations different in distance from the rotation axis of a feeding roller 21. As illustrated in FIG. 10, a spool 11E according to the fourth embodiment includes a flange 11*f* provided with markers $m_{bit}$, $m_{pt}$, and $m_{ST}$. The spool 11E can be similar in configuration to the spool 11 according to the first embodiment illustrated in FIG. 2 except for the disposition of markers $m_{bit}$, $m_{pt}$, and $m_{ST}$. FIG. 10 is a side view of the spool according to the fourth embodiment, and is a plan view of the flange for explaining the marker disposition.

(Spool)

On the spool 11E, the bit markers ma, the point markers ma, and the start point marker $m_{ST}$ are different in distance from the rotation axis, similarly to the spool 11B according to the second embodiment illustrated in FIG. 6. In FIG. 10, the start point marker $m_{ST}$, the point markers $m_{pt}$ and the bit markers $m_{bit}$ are disposed on the flange 11*f* in the order of proximity from the rotation axis, but the disposition order from the rotation axis is not defined. The start point marker $m_{ST}$ is disposed at a position detectable by a third sensor of the sensor 4, the point markers $m_{pt}$ are each disposed at a position detectable by a first sensor of the sensor 4, and the bit markers $m_{bit}$ are each disposed at a position detectable by a second sensor of the sensor 4. FIG. 10 illustrates a sensing position 41 for the first sensor, a sensing position for 42 for the second sensor, and a sensing position 43 for the third sensor of the sensor 4.

In a case where the flange 11*f* is divided into N number of divided regions (N is an even number of 4 or more). N/2 number of point markers $m_{pt}$ in total are disposed one-by-one per two divided regions to the N number of divided regions. In FIG. 10. N is simply indicated as N=32, and thus 16 point markers $m_{pt}$ are disposed. In other words, the point markers $m_{pt}$ are disposed one-to-one along N/2 number of radii that divide the flange 11*f* into the (N/2) number of divided regions equal to each other. The point markers $m_{pt}$ each have a dimension detectable by the sensor 4 (first sensor), and a gap between point markers $m_{pt}$ circumferentially adjacent to each other is set to a length such that that the sensor 4 does not erroneously detect the gap. Further, the width of each point marker $m_{pt}$ and the length of the gap between the point markers $m_{pt}$ circumferentially adjacent to each other are preferably closer to each other, and more preferably equal to each other.

Similarly to the first and second embodiments, the bit markers $m_{bit}$ are disposed one-to-one in 0 to the N number of divided regions. A divided region where the bit marker $m_{bit}$ is disposed is defined as "1" and a divided region where no bit marker $m_{bit}$ is disposed is defined as "0". The bit markers $m_{bit}$ are disposed corresponding to N-bit encoded information in order from the first digit in the counterclockwise direction. The bit markers $m_{bit}$ are preferably disposed one to one along 0 to the N number of radii among the N number of radii that divide the flange 11*f* into the N number of divided regions. In a case where there is a point marker n disposed in the same divided region, the bit marker $m_{bit}$ is preferably arrayed along one of the N number of radius (one is represented by a one-dot chain line) with the point marker $m_{pt}$, that is, the bit marker $m_{pt}$ is preferably the same in orientation based on the rotation axis. The bit markers $m_{bit}$ each have a dimension detectable by the sensor 4 (second sensor), and bit markers $m_{bit}$ disposed in adjacent divided region (in assumption) are in succession (without a gap).

Similarly to the spool 11B according to the second embodiment, the start point marker $m_{ST}$ is preferably disposed in the same divided region as the bit marker $m_{bit}$ of the first digit of the information string, and preferably disposed with the bit marker $m_{bit}$ along one of the N number of radii (one is indicated by the one-dot chain line) as illustrated in FIG. 10. Note that, in FIG. 10, the point markers $m_{pt}$ are disposed in the same divided region as the bit markers $m_{bit}$ of the odd-numbered digits of the information string, and thus, the start point marker $m_{ST}$ is disposed in the same divided region as the bit marker $m_{bit}$, but the point markers $m_{pt}$ may be disposed in the divided regions of the even-numbered digits of the information string. In FIG. 10, the 32-bit (N=32) information string indicated by the bit markers $m_{pt}$ represents "0000 0111 0101 1011 1100 1101 0001 0101". When the information string results from an encoded decimal numerical value, the information string represents "123456789" in decoding.

(Method of Detecting Remaining Amount of Long Member and Method of Reading Information)

With reference to FIGS. 10, 4A, 4B, 4C, and 7, description will be given of a procedure different from that in the second embodiment regarding a method of detecting the remaining amount of a long member and a method of reading binary-encoded information given to the spool that supplies the long member in conveyance of the long member by the conveying device according to the fourth embodiment.

In the present embodiment, processing after the information string is read (S44; 1) is similar to those of the first and second embodiments. In processing before the information string is read (S44; 0), when the first sensor of the sensor 4 makes a switch from marker non-detection to marker detection (S41; YES), a start point flag (S34) is read and start-point detection processing is performed (S5A), and information-string write processing is performed (S6) similarly to the second embodiment. Further, in the present embodiment, when the first sensor makes a switch from marker detection to marker non-detection (S31; NO), the information-string write processing is performed (S6). On the spool 11E, in a case where a point marker $m_{pt}$ is disposed in the same divided region as the bit marker $m_{bit}$ of the even-numbered digit of the information string, when the first sensor makes a switch from marker detection to marker non-detection (S31; NO), the start point flag is read (S34) and the start-point detection processing is performed (S5A).

(Modification)

Similarly to the modification of the second embodiment, on a spool 11E according to the present embodiment, some consecutive digits in information string are set as a predetermined pattern indicating the start point, so that a bit marker n as the start point can be read without a start point marker $m_{ST}$. Therefore, the spool 11E is preferably provided with bit markers $m_{bit}$ and point markers $m_{pt}$, and a conveying device 10 can preferably detect two locations with a sensor 4.

Equal disposition of the point markers $m_{pt}$ on the spool 11E enables the conveying device 10 to control the conveying speed with high accuracy as described in the second embodiment. Further, a sensing position 41 for a first sensor of the sensor 4, a sensing position 42 for a second sensor of the sensor 4, and a sensing position 43 of a third sensor of the sensor 4 can be circumferentially shifted from each other by an integral multiple of (360°/N), and the sensing positions 41, 42, and 43 can be detected at two or more locations symmetric with respect to the rotation axis as a point of symmetry.

On the spool 11 according to the first embodiment illustrated in FIG. 3, bit markers $m_{bit}$ can each cover two or more circumferences different in distance from the rotation axis. As a result, the number of digits of information string can be extended to an integral multiple of N. Further, on such a spool 11, a start point marker $m_{ST}$ may be disposed the same in distance from the rotation axis as one of the bit markers $m_{bit}$. For example, in a case where the bit markers $m_{bit}$ each cover the two circumferences, similarly to the conveying device 10 according to the second embodiment, the sensor 4 can preferably parallelly detect three locations different in distance from the rotation axis.

Similarly, on the spool 11E according to the fourth embodiment illustrated in FIG. 10, bit markers $m_{bit}$ can each cover two or more circumferences different in distance from the rotation axis. Further, for a bit marker $m_{bit}$ covering at least one circumference, some consecutive digits in the information string is set as a predetermined pattern indicating the start point, which can eliminate provision of a start point marker $m_{ST}$. For example, in a case where the bit markers $m_{bit}$ each cover the two circumferences, the sensor 4 can preferably parallelly detect three locations different in distance from the rotation axis. In addition, the bit markers $m_{bit}$ of the spool 11 according to the first embodiment or the bit markers $m_{bit}$ of the spool 11E according the fourth embodiment may be combined with the spool 11D according to the third embodiment illustrated in FIG. 9.

Each conveying device according to the embodiments of the present invention can convey a linear or string-shaped member such as a wire or a cable without limiting an object (long member) as a conveyance target having a band shape, and thus is applicable to a conveyance mechanism of a device for such a long member subjected to processing, for example. Each spool according to embodiments of the present invention can be applied to a package member for winding and holding a belt-shaped or linear member to be conveyed by such a conveying device or a jig of such a conveying device.

According to an embodiment of the present invention, with the spool, the long member, the conveying device, and the cleaning device, information regarding the cartridge of the long member can be read and recorded with the function of the conveying device for measuring the remaining amount of the long member. Thus, use of a dedicated reader is eliminated.

Although embodiments of the present invention have been described and illustrated in detail, the disclosed embodiments are made for purposes of illustration and example only and not limitation, and thus modifications can be made without departing from the gist of the present invention. The scope of the present invention should be interpreted by terms of the appended claims.

What is claimed is:

1. A spool that is rotatably journaled and has a long member wound around the spool, the spool comprising:

a marker with which a side face of the spool is provided, the side face being orthogonal to a rotation axis of the spool, wherein:

the marker includes an information-detection bit marker indicating information regarding the long member, the information-detection bit marker is disposed equidistant from the rotation axis, in a case where a circle about the rotation axis is circumferentially divided into N (N≥2) number of divided regions that are fan-shaped, (i) the information-detection bit marker is disposed in at least one of the N number of divided regions, and (ii) the information binary-encoded is indicated based on presence or absence of the information-detection bit marker for each of the N number of divided regions, the marker includes N number of information-detection point markers in total, the N number of information-detection point markers are disposed one-to-one in the N number of divided regions, spaced apart from each other, equidistant from the rotation axis, and different in distance from the rotation axis from the information-detection bit marker, the information-detection bit marker is identical in orientation based on the rotation axis to the N number of information detection point markers, and the marker includes an information start-point marker that is identical in distance from the rotation axis to the information-detection bit marker and is identical in orientation based on the rotation axis to a region interposed between two information-detection point markers circumferentially adjacent to each other among the N number of information-detection point markers.

2. The spool according to claim 1, wherein the N number of divided regions of the circle are equal to each other.

3. The spool according to claim 1, wherein the information start-point marker indicates a start point of the information-detection bit marker.

4. The spool according to claim 1, wherein the N number of information-detection point markers are shorter in length in a direction orthogonal to a radial direction of the circle than the information-detection bit marker.

5. The spool according to claim 1, wherein a region with which the marker is provided on the side face and a region out of the region with which the marker is provided on the side face are different in light reflectance or light transmittance.

6. The spool according to claim 1, wherein the marker with which the side face is provided has a protrusion, a recess, or a hole.

7. The spool according to claim 1, wherein one of a region with which the marker is provided on the side face and a region out of the region with which the marker is provided on the side face is conductive and another of the region with which the marker is provided on the side face and the region out of the region with which the marker is provided on the side face is insulative.

8. A long member wound around the spool according to claim 1 as a core.

9. A conveying device comprising:

a support member supporting rotatably the spool according to claim 1;

a sensor that detects the marker with which the spool is provided, the spool being supported by the support member, and a hardware processor that counts a number of detections of the marker by the sensor to calculate a length of a portion of the long member, the portion being wound around the spool, and reads the information indicated by the information-detection bit marker.

10. The conveying device according to claim 9, wherein in a first operation after attachment of the spool to the support member, the spool rotates at a rotation rate until the sensor detects all the information-detection bit marker and rotates reversely at a rotation rate identical to the rotation rate at which the spool rotates.

11. The conveying device according to claim 9, wherein the sensor detects the marker at two or more locations symmetric with respect to the rotation axis of the spool as a point of symmetry.

12. A cleaning device comprising:

the conveying device according to claim 9;

the spool supported by the support member of the conveying device; and a wiping member wound around the spool, wherein the wiping member wipes off a nozzle face of an inkjet head of an image forming apparatus.

* * * * *